Aug. 21, 1945.  C. W. CHERRY ET AL  2,383,107
TRANSMISSION MECHANISM
Filed Jan. 18, 1943  4 Sheets-Sheet 1
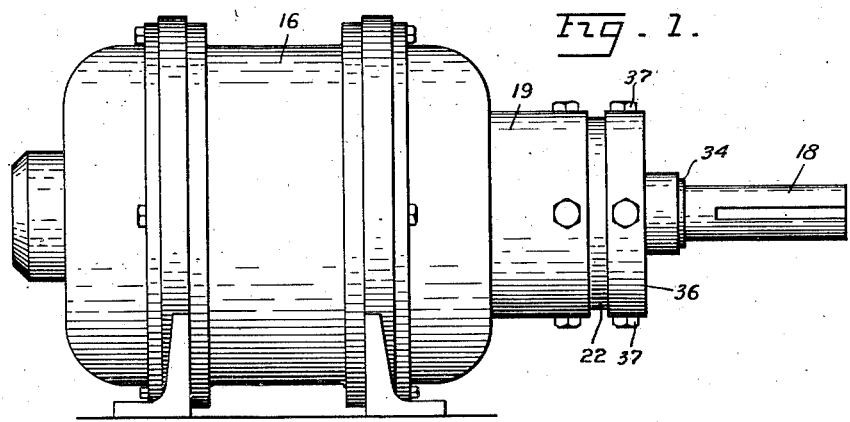
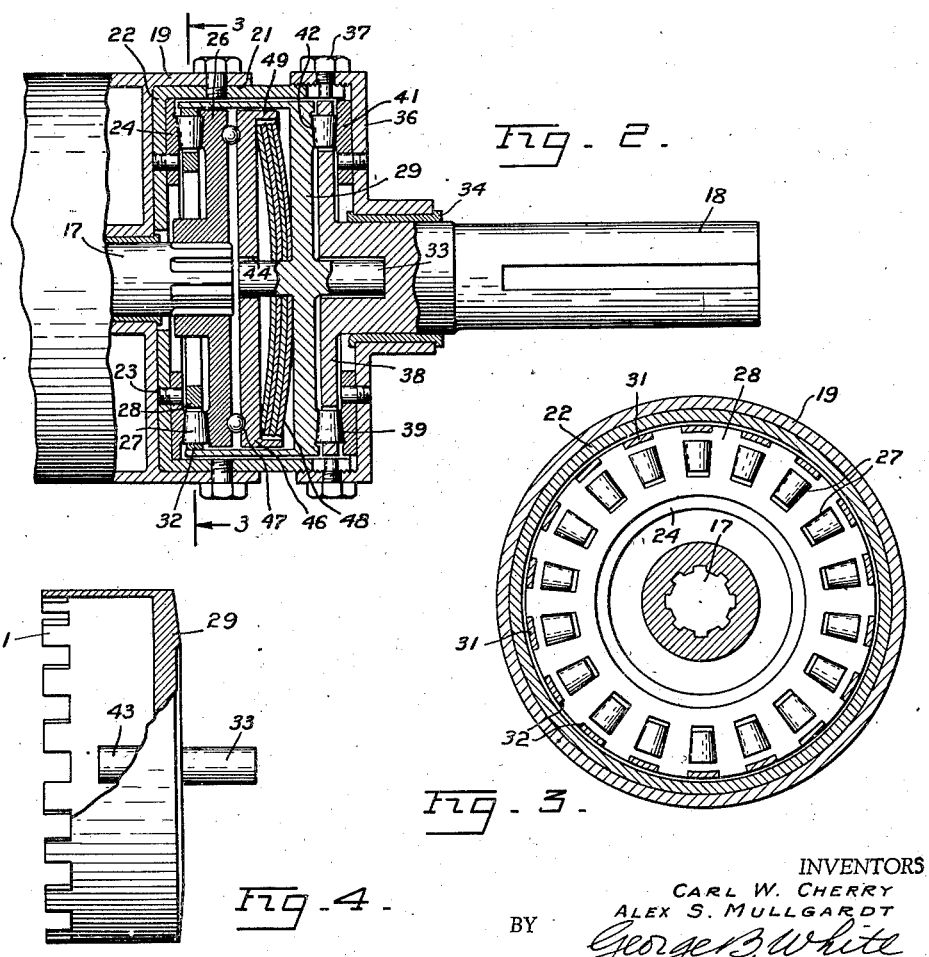
INVENTORS
CARL W. CHERRY
ALEX S. MULLGARDT
BY George B. White
ATTORNEY.

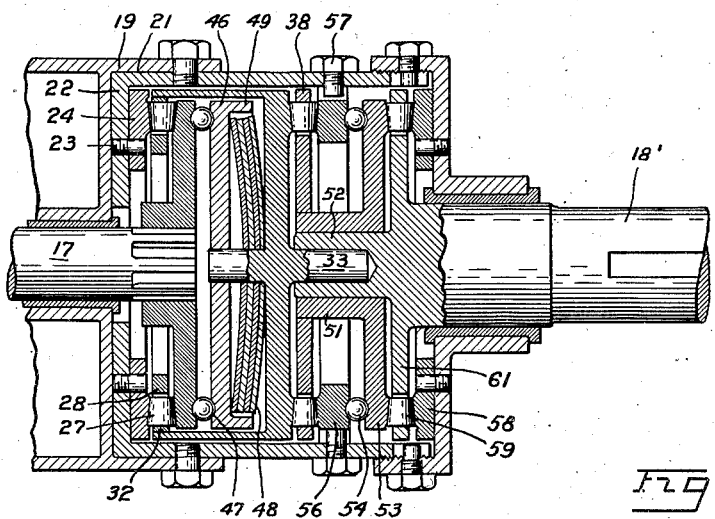
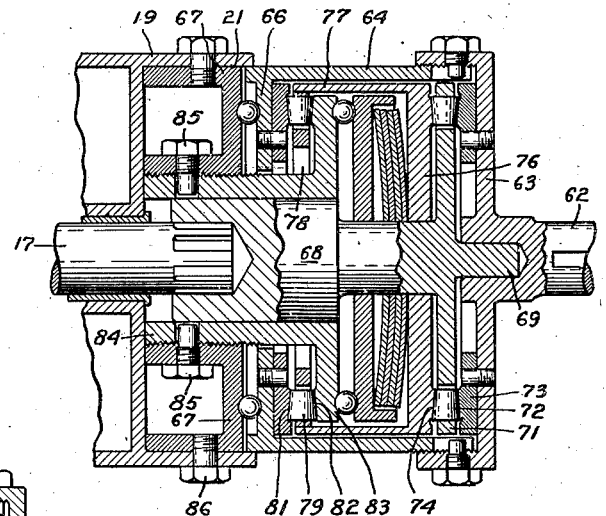
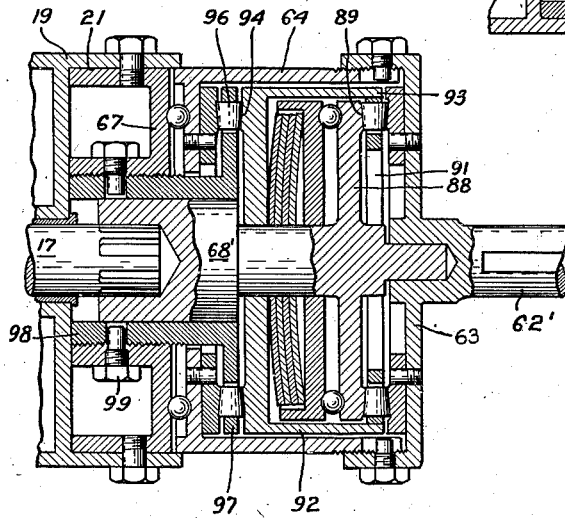

Aug. 21, 1945.  C. W. CHERRY ET AL  2,383,107
TRANSMISSION MECHANISM
Filed Jan. 18, 1943   4 Sheets-Sheet 3
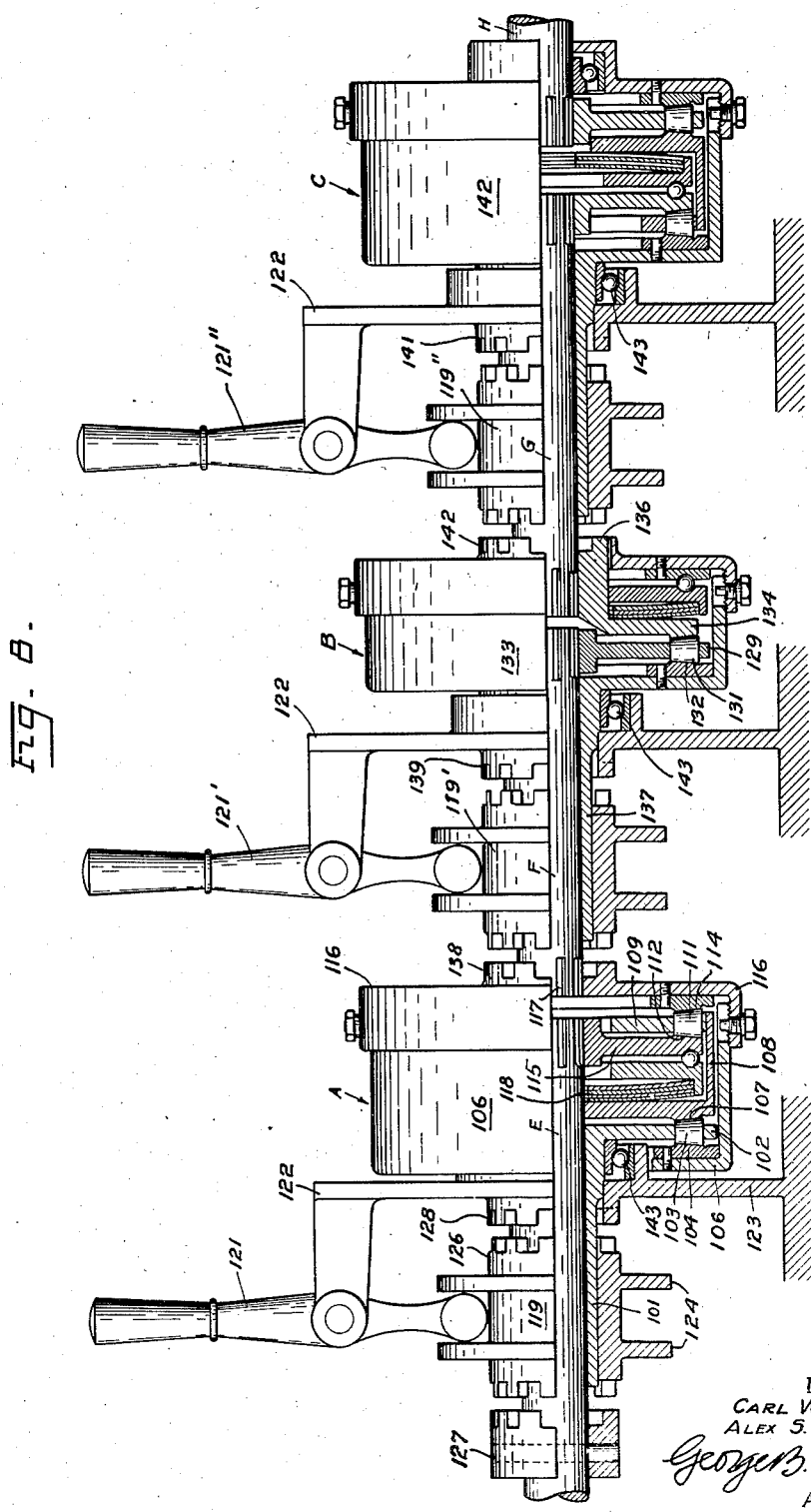
INVENTORS
CARL W. CHERRY
ALEX S. MULLGARDT
George B. White
ATTORNEY.

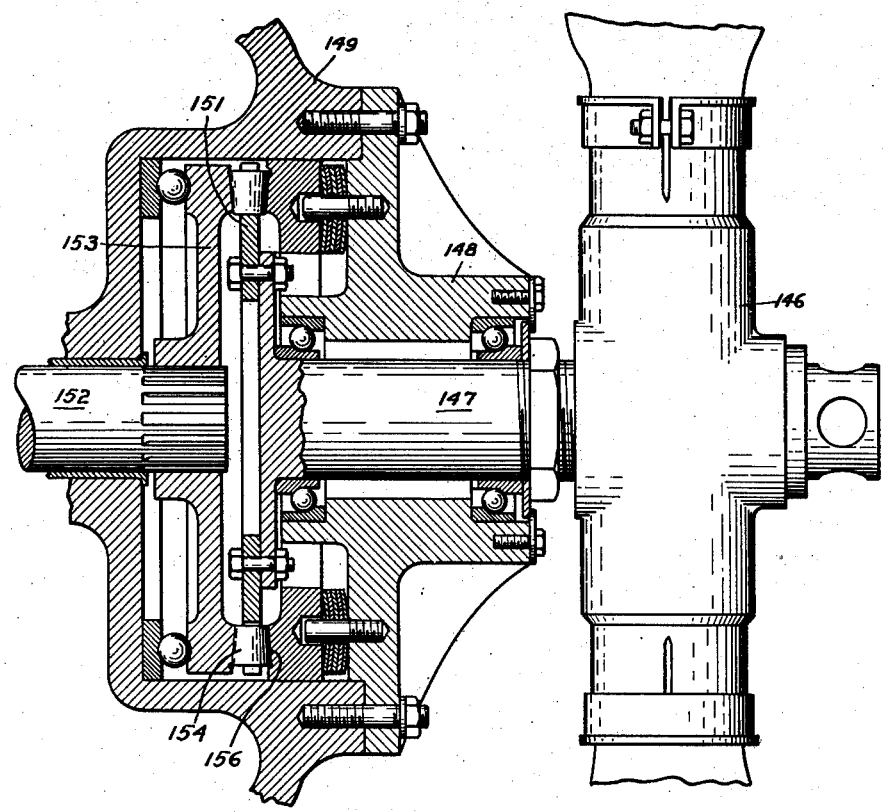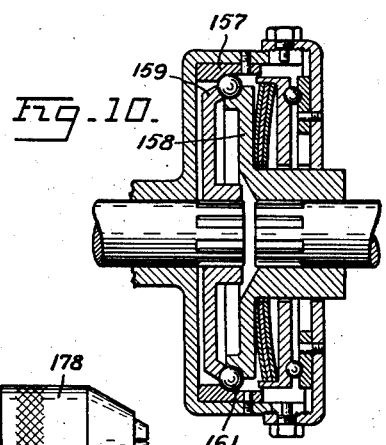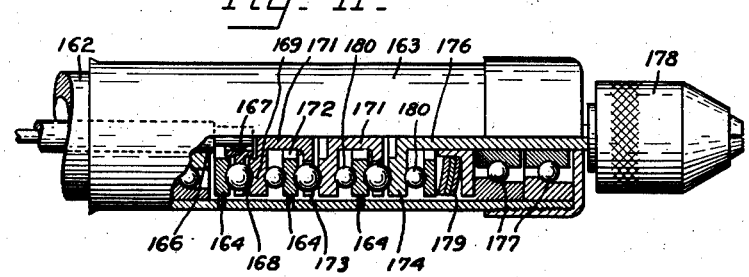

Patented Aug. 21, 1945

2,383,107

UNITED STATES PATENT OFFICE 2,383,107

TRANSMISSION MECHANISM

Carl W. Cherry, Carmel, and Alex S. Mullgardt, Altadena, Calif.

Application January 18, 1943, Serial No. 472,802

21 Claims. (Cl. 74—302)

This invention relates to a transmission mechanism.

Particularly the invention relates to new and useful improvements in means for transmitting rotary motion through the medium of balls or rollers of the type used in ball and thrust bearings, and wherein the ratio of transmission from the driving end to the driven end of the mechanism is determined according to whether the ball or roller cage or either of the races or rings or tracks are held stationary; in other words the ratio of speed between the driving end and the driven end of the transmission is determined according to whether the case, or the retainer or cage, or the race or track adjacent the balls or rollers, is non-rotating.

Another object of the invention is to provide a transmission utilizing the differential action between the balls or rollers and the races or tracks on which they ride, so as to obtain a desired speed ratio of transmission from a driving shaft to a driven shaft.

Another object of the invention is to provide a plurality of transmission units of the character described, and means to selectively combine said units for various speed ratios so as to allow quick and easy shifting to desired speed.

The invention is herein described in several illustrative embodiments, but it is understood that changes may be made in the construction of of parts and mechanisms described herein without departing from the spirit of the invention.

The invention is clearly illustrated in the accompanying drawings wherein

Fig. 1 is an external view of a transmission connected to the shaft of an electric motor.

Fig. 2 is a sectional view of said transmission on the electric motor.

Fig. 3 is a sectional view of said transmission, the section being taken on the lines 3—3 of Figure 2.

Fig. 4 is a partly sectional detailed view of a driving cup.

Fig. 5 is a sectional view of a two stage transmission.

Fig. 6 is a sectional view of a transmission having another ratio wherein the housing is rotatable.

Fig. 7 is a sectional view of a transmission of still another ratio with a floating or rotatable housing.

Fig. 8 is an assembly view partly in sections of a plurality of transmissions of different ratios and means to selectively combine them for various desired driving speeds.

Fig. 9 is a sectional view of our transmission applied to an aircraft propeller.

Fig. 10 is a sectional view of another embodiment of the transmission having one stage with races of different diameters, and Fig. 11 is a sectional view of a three stage transmission on the end of a flexible tool shaft.

In its general organization our invention includes rollers or balls preferably of the type used in thrust bearings in which the balls or rollers of the bearing run between two races and are contained in a retainer or cage. Various ratios and speeds of transmission are accomplished by holding either one race or the other race or the cage relatively fixed and by driving through the remaining elements. The ratio of transmission is determined according to the particular element which is held relatively stationary and according to the element through which the driving force is applied to the transmission.

In the illustrative embodiment shown in Figure 1 our transmission is applied to the shaft of an electric motor 16. Figures 2 to 4 illustrate the structure of the type of transmission which permits a ratio of 4:1 transmission from the motor shaft 17 to the driven shaft 18. The end of the casing of the motor 16 has an annular apron 19 projecting therefrom to form a cylindrical recess 21 in which latter is secured a cup 22 so as to be held against rotation by means of set screws. The bottom of this cup 22 is adjacent the bottom of said recess 21. A fixed race 24 is mounted on the bottom of this cup 22. The end of the motor shaft 17 is splined and it carries a rotating race 26. Between the fixed bottom race 24 and the driving rotating race 26 are a plurality of friction rollers 27 rotatably held in a floating cage 28 so that the rollers 27 engage and ride between the fixed bottom race 24 and the driving race 26 and are moved around with the cage 28 on the fixed bottom race 24.

A substantially cylindrical driving cup 29 is extended in the space between the peripheries of the driving race 26 and the fixed up 22. This driving cup 29 is facing oppositely to the fixed cup 22 and is rotatable therein. As shown in Figure 4 the open edge of the driving cup 29 is serrated or notched at 31 so as to interlock with slots 32 in the periphery of the cage 28 in the manner shown in Figure 3. The bottom of the driving cup 29 has a journal pin extended on each side thereof. The journal pin 33 extended from the outside of the bottom of the driving cup 29 is journalled in the end of the driven shaft 18 which latter in turn is journalled in a bearing 34 of a housing cap 36 threadedly secured on the outer end of the fixed cup 22 and held against rotation by suitable set screws 37. From the inner end of the driven shaft 18 extends a driven cage 38 carrying rollers 39 which ride on a fixed race 41 on the bottom of the housing cap 36 and are driven by engagement with a race 42 on the outer face of the bottom of the driving cup 29.

The slippage of the rollers 27 and 39 is controlled by an adjustable compression mechanism inside the driving cup 29. An inner journal pin 43 is extended inwardly from the bottom of the driving cup 29. This pin 43 is journalled in a hole 44 in a flanged retainer disc 46 which latter presses non-friction balls 47 against the first driving race 26. A plurality of superimposed leaf springs 48 are disposed between the inner face of the bottom of the driving cup 29 and the retainer disc 46 so that the ends of the springs 48 are adjacent the peripheral flanges 49 of the retainer disc 46. The central bow of the group of leaf springs 48 bears against the inner face of the bottom of the driving cup 29. The frictional contact between the driving cup 29 and the leaf springs 48 can be increased or decreased and the slippage of the respective races regulated by adjusting the housing cap 36 on the fixed housing cup 22.

It is to be noted that in this embodiment there are two stages of transmission. In both stages the transmission occurs through a cage as a driven element and there is a reduction of revolutions per minute in accordance with the differentiating action of the rolling of the rollers 27 and 39. In the first stage the transmission is through the floating cage 28 and in the second stage transmission is through the driven cage 38 on the driven shaft 18.

The rotating or driving race 26 is rotated by the motor shaft 17 directly. The first stage rollers 27 are rotated by the driving race 26 so as to ride around on the fixed track or race 24. This rotates the first stage cage 28 at a reduction of 2:1. The first stage cage 28 rotates the driving cup 29, which in turn rotates the second stage rollers 39 on the outer fixed race 41. The second stage rollers 39 rotate the second driven cage 38 at a second reduction of 2:1 relatively to the driving cup 22. The driven cage 38 is an integral part of the driven shaft 18 and therefore rotates the latter at a ratio of 4:1 relatively to driving shaft 17. It is to be understood that in the event an increase of speed is desired the same transmission can be used in reverse to the arrangement heretofore described, namely power would be applied through the shaft 18 journalled in the housing cap 36 and delivered through the shaft 17.

The relative ratios between the speeds of the driving and driven shafts and the diameters of the fixed and moving races may be stated as $$\frac{R.\ P.\ M.}{R.\ P.\ M.'} = \left(\frac{D}{D'}+1\right)^n$$

where R. P. M. is the revolutions per minute of the driving shaft, R. P. M.' is the revolutions per minute of the driven shaft, D is the diameter of the fixed race, D' is the diameter of the moving race, and $n$ is the number of stages. When the diameters of the races are equal the reduction is 2:1. Thus in case of the two stages as shown in Figures 2 to 4, the reduction will be 4:1.

In the embodiment shown in Figure 5 two stages of transmission exactly the same type as in the first described embodiment are used with an additional stage. This is accomplished by splining the cage 38 of the second stage to a hub 51 journalled on a reduced inner end 52 of the driven shaft 18'. On this hub 51 is a third stage driving race 53 which is backed against a ball bearing 54 on a stationary partition ring 56 which also forms the fixed race ring for the second stage of the transmission. This partition ring 56 is suitably held against rotation by set screws 57. Between the third stage driving race 53 and the fixed race 58 on the inside face of the housing cap are rolled the third stage rollers 59 held in a disc cage 61 which latter is part of the driven shaft 18'. In other respects this transmission operates similarly to the first transmission herein described. However the ratio of reduction of this three stage transmission is 8:1.

The embodiment shown in Figure 6 accomplishes a different ratio by driving off the housing instead of off the cage or retainer. In this form a driven shaft 52 is fixed with the housing cap 63 which latter is fixed on the outer cup 64. This cup 64 may be termed as a floating cup because it rotates on a ball thrust bearing between its bottom 66 and a filler base 67 in the recess 21 within the annular apron 19. The driving shaft 17 is splined to an auxiliary shaft 68 the outer end of which latter has a stud 69 thereon journalled within the driven shaft 62. On said outer end of the auxiliary shaft 68 is fixed a first stage driving cage 71 carrying rollers 72 of the outer stage of transmission. These outer rollers 72 are between a race 73 formed on the inner surface of the housing cap 63 and another race 74 formed on the outside face of the bottom 76 of a driving cup 77. This driving cup 77 is connected to a floating cage 78 of the inner or second stage in the manner of the connection of the driving cup 29 in the first described form herein. The cage 78 of the inner second stage holds the second stage rollers 79 therein between a race 81 on the face of the bottom 66 of the outer cup 64 and a fixed race 82 formed on a disc 83 fixed on a hub 84 which latter is held against rotation by set screws 85 in the recess of the filler base 67. Screws 86 hold the filler base 67 in the recess 21 of the apron 19. The auxiliary shaft 68 rotates within said hub 84. The compression adjusting spring device herein is the same as in the form heretofore described.

In the form shown in Figure 6 the drive is applied not through a moving race opposite a fixed race, but through the moving cage between movable races. The ratio of speeds 3:4 is arrived at as follows:

The formula in the event of a fixed race and a movable casing is $$\frac{\left(\frac{D_l}{D_s}+1\right)^n}{\left(\frac{D_l}{D_s}+1\right)^n-1}=\frac{R.\ P.\ M.'}{R.\ P.\ M.}$$

where $D_l$ and $D_s$ are the respective radii of the opposed races. In this showing the radius of each race being equal with the radius of the opposed race, the ratio is 1. $n$ is the number of stages. In the illustration of Figure 6 there are two stages. Therefore the ratio is 4:3 between the rotary casing 64 and the motor shaft 17. In other words the clue to the ratio between the driving and driven end is found by first determining the fixed surface from which the ratio is taken off. In this form the fixed race 82 is on the fixed disc 83 and fixed hub 84. The inner stage cage 78 and rollers 79 rotated on this fixed race 82 transmit motion to the race 81 and to the casing or outer cup 64 at a ratio of two revolutions of the outer cup 64 to one revolution of the inner stage cage 78. Hence to rotate the outer cup 64 one revolution the inner stage cage 78 and inner drive cup 77 must rotate one-half revolution for each revolution of the outer cup 64. Examining now the outer stage, and assuming that the outer cup 64 is fixed, then by the aforesaid 2:1 ratio each half revolution of the inner driving cup 77 corresponds to one-quarter revolution of the driving or outer stage cage 71. Then assuming that the inner driving cup 77 is stationary then each revolution of the outer cup 64 corresponds to one-half revolution of the outer stage cage 71. The compound effect of the moving inner cup 77 and outer cup 64 on the outer or first stage cage 71 is that for each revolution of the outer cup 64 the outer cage 71 and therefore the driving or motor shaft 17 must rotate one-half plus one-quarter revolutions, namely a total of three quarter revolutions. This establishes the ratio between the motor shaft 17 as a driving shaft and the outer cup 64 fixed to the driven shaft 62 as 3/4:1 or in other form a ratio of 3:4.

In the form shown in Figure 7 there is a floating housing or outer cup 64 and an auxiliary shaft 68 as described in connection with Figure 6, but in this form the auxiliary shaft 68' has a disc 88 extended therefrom to form one of the races 89 in the outer stage of the transmission at the cap 63. The cage 91 in this outer stage is floating. The inner cup 92 is turned around so that its open edge 93 interlocks with the floating cage 91 of the outer stage. A race 94 on the bottom of the inner cup 92 forms a race for the rollers 96 of the inner stage. The cage 97 of this inner stage is fixed by means of its hub 98 which is held by set screws 99 in the filler base 67 similarly to the hub 84 of Figure 6. The hub of the auxiliary shaft 68' is journalled in the hub 98 of the cage 97.

In this form the ratio is 3:—1.

The formula applying to the ratio of the form shown in Figure 7 is $$\left[(-1)\left(\frac{D_1}{D_s}+1\right)^n+1\right]:1$$

where $D_1$ and $D_s$ are the respective radii of the opposed races and $n$ is the number of stages. In this illustration the radii of the opposed races are equal therefore the ratio is 3:—1. The ratio between the driving and driven elements may be again explained by commencing with the motion relatively to the fixed element in this form the cage 97 for the rollers 96. In order that the outer cup 64 move one revolution in one direction the inner race 94 and the inner cup 92 must rotate one revolution in the opposite direction. The inner cup 92 being rotated by the outer floating cage 91 off the race on the disc 88 and shaft 68', therefore presuming that the outer cup 64' is stationary the ratio between the drive shaft 88 and the inner cup 92 is 2:1 in the same direction. Presuming that the outer cage 91 is stationary, as the shaft 68' then the inner stage race 94 must rotate one revolution oppositely to each revolution of the outer cup 64' which adds one more revolution to the rotation of the inner cup 92 in the same direction as the shaft 68', making it a total of 3 revolutionn of the auxiliary shaft 68' for one opposite revolution of the driven shaft 62' as the latter is rotated by the outer cup or housing 64'.

The embodiment in Figure 8 shows the combination of a plurality of transmissions of our invention into a selective speed transmission mechanism which can be shifted easily. In this illustrative embodiment there are three transmission units A, B, and C. Shafts E, F, and G respectively transmit power or torque to the transmissions A, B, and C. The ultimate driven shaft in this illustration is indicated by the letter H. By having different ratios in each transmission unit a number of combinations of transmission ratios can be achieved.

The transmission A includes a sleeve 101 rotatable on the driving shaft E the inner end of which is formed into a disc cage 102 to carry rollers 103 which latter ride on a race 104 on the inner face of a rotatable housing 106 and on a race 107 on the bottom of a connecting or inner cup 108. The open end of inner cup 108 is interlocked with the outer periphery of another cage 109 of another stage. This second cage 109 floats and its rollers 111 ride between a disc race 112 fixed on the splined end 115 of the first shaft E and on another race 114 on the inside face of the cap 116 for the housing 106. The cap 116 of the housing 106 is splined on the end 117 of the second shaft F. The pressure on the races is achieved by a leaf spring device 118 as in the forms heretofore described. This transmission A operates at two speed ratios depending on the connection of the sleeve 101. For selective connection of the sleeve 101 a sliding dog 119 is splined on the sleeve 101. A suitable shifting lever 121 is pivotally mounted on a bracket 122 on the stationary frame 123; and works between yoke collars 124 of the sliding dog 119. Serrations or teeth 126 at the opposite ends of the dog 119 are suitable to respectively interlock with a shaft dog 127 fixed on the first shaft E for direct drive, or with another fixed dog 128 on the stationary frame 123.

In operation when the sliding dog 119 is connected to the shaft dog 127 then the first shaft E rotates the sleeve 101 and the disc cage 102 thereon as well as the second disc race 112 thereby locking the housing 106 to the cages 102 and 109 so as to rotate the first transmission A together as a unit. The housing 106 and its cap 116 rotating at the same speed as the first shaft E and thus the transmission ratio between the first shaft E and the second shaft F in such connection is 1:1. When the sliding dog 119 is shifted to interlock with the dog 128 of the stationary frame 123, then the sleeve 101 and the first disc cage 102 thereon are held stationary and the driving is accomplished from the first shaft E and second disc race 112 to the second cage 109, through the race 114 on the cap 116 and through the race 107 on the inner cup 108 to the housing race 104, rotating the housing 106 and its cap 116 at the ratio of 1:—⅓. In the neutral position of the first shift lever 121 there is no power transmitted from the first shaft E to the second shaft F.

The second transmission unit B substantially corresponds in operation to the inner or last stage of the type of transmission shown in Figure 2. In the unit B the second drive shaft F has splined thereon a disc cage 129 which carries rollers 131. These rollers 131 ride between a race 132 on the housing 133 and a disc race 134. A hub 136 of the disc race 134 is splined on the third shaft G for driving the same. A second shift lever 121' works on a second dog 119', but this second dog 119' is splined on a sleeve 137 extended from the housing 133. The second shift lever 121' and dog 119' are similar to the first set and operate the same way as heretofore described. When the second dog 119' is so shifted that it directly interlocks with a notched hub 138 of the cap 116 of the first transmission A, then the housing 133 of the second transmission B and the second shaft F are rotated in unison and at the same speed and transmit rotation at a direct 1:1 ratio. When the second dog 119' is shifted to interlock with a fixed dog 139 on the frame then the housing 133 and its race 132 are held stationary and rotation is transmitted through the cage 129, rollers 131, disc race 134, and its hub 136 to the third shaft G at a ratio of 1:2.

Transmission C corresponds to the transmission shown in Figure 2. When the third shifting dog 119" is shifted by the lever 121" to engage the fixed dog 141 on the frame it holds the housing 142 stationary and rotation is transmitted from the shaft G to the driven shaft H at a ratio of 4:1 or 1:¼ as heretofore described in connection with Figure 2. When the shifting dog 119" is connected with a dog 142 the housing cap of the preceding transmission unit B then the shafts G and H and the housings 133 and 142 are rotated together for a direct 1:1 transmission.

By manipulating the shift levers 121, 121', and 121" several selective speeds are available in this illustrative embodiment of selective transmission. When all the shift levers are in neutral as shown in Figure 8 then there is no rotation transmitted. For 1:1 direct drive from the shaft E to the shaft H all the shift levers are turned to the right viewing Figure 8, so that the first shift dog 119 is interlocked with the fixed dog 127 on the drive shaft E, and all the other shift dogs are interlocked with the respective preceding transmission housing caps. From this 1:1 position an 1:—⅓ reverse drive may be obtained by shifting the first lever 121 to the left extreme position viewing Figure 8 so as to hold the first shifting dog 119 stationary against the frame. Thus the first transmissions 1:—⅓ ratio is transmitted to the driven shaft H. Also the second lever 121' from its direct drive position over to the extreme left position viewing Figure 8 so as to hold the second shift dog 119' also stationary the reverse speed can be increased by adding the 1:2 ratio of transmission of the second transmission unit B to the 1:—⅓ ratio of the first unit A, with a resulting ratio of 1:—⅔. The reverse speed may be now reduced by shifting the third lever 121" and dog 119" to the extreme left position viewing Figure 8, so that the third shifting dog 119" is interlocked with the fixed frame and the 1:—⅔ speed is transmitted from the shaft G to the shaft H by the added ratio of reduction of 1:—¼ thus reducing the reverse speed to 1:—⅙. The reverse speed may be further reduced now by returning the second shift lever 121' and dog 119' to the direct connection 1:1, which will give a reverse speed of 1:—⅓ directly transmitted 1:1 through the second transmission B and reduced by the third transmission C by a ratio of 1:—¼ to the ultimate reversed ratio of 1:—1/12.

On the forward speeds the first transmission A is held in the direct 1:1 position, the shift dog 119 interlocked with the fixed dog 123. As heretofore mentioned there is an 1:1 forward speed when all the shifting dogs are interconnected with the preceding driving element. The forward speed may be increased by shifting the second lever 121' so as to interlock the second shifting dog 119' with the stationary frame thus operating the second transmission B at the 1:2 ratio, with a resulting over all ratio of forward speed of 1:2. A reduced forward speed may be accomplished by also shifting the last dog 119" into engagement with the fixed frame and then the 1:¼ ratio of reduction in the last shift will result in an over all transmission ratio of 1:½. If the first and second transmissions are in direct drive position and the third transmission unit C is in the reducing position, then the over all transmission ratio is 1:¼. The selective transmission may be constructed with various types of units coacting similarly but accomplishing a variety of ratios suitable to given conditions. The shift levers and dogs may be shifted in any suitable manner. It is to be noted that the frame 123 of this multiple speed transmission may be designed to suit the conditions of its application. The leaf spring pressure device 118 and its coaction with the respective housing caps is the same in each of the units. The housings of the units are supported on suitable non-friction journals, such as ball bearings 143 on the brackets of the frame 123.

In Figure 9 is shown an embodiment of this type of transmission to aircraft propellers. The propeller hub 146 has its usual propeller shaft 147 journalled in a housing cap 148. The housing 149 of the transmission is fixed. In this illustration the housing 149 is formed on the crankcase of the driving means or engine, not shown. Inside the housing is a 2:1 transmission unit which is the same in structure as the second unit B of the selective transmission shown in Figure 8, except that the action is reversed, namely the driven propeller shaft 147 is connected to the cage 151 and the driving crankshaft 152 is connected to the rotating disc race 153. The crankshaft 152 through the disc race 153 rotates the rollers 154 on the stationary race 156 on the housing so as to rotate the cage 151 and the propeller shaft 147 at a reduced speed in the ratio of 1:½.

Figure 10 is an illustrative embodiment of a transmission wherein the diameter of a fixed race 157 is larger than the diameter of the rotating race 158. The cage 159 is suitably castellated so as to locate the rollers or balls 161 between the races 157 and 158 for driving contact. This transmission unit for instance could be used in place of the second unit B in the selective transmission shown in Figure 8 and achieve different ratio combinations when desired. The formula for calculating the ratio heretofore mentioned in connection with fixed housings applies to this form, namely $$\left(\frac{D_e}{D_s}+1\right)^a$$

and obviously this will give a larger increase of speed at the driven element than transmissions where $$\frac{D_e}{D_s}$$

equals 1.

In Figure 11 is shown a three stage transmission mounted on the end of a flexible shaft 162 for tools, such as drills, grinders, etc. On the end of this flexible shaft 162 is a housing 163 in which are held stationary races 164. From the end of the driving shaft 166 extends a cage 167 the rollers or balls of 168 of which ride on the first stationary race 164 and transmit rotation to a rotatable race 169 on a spindle 171 which latter extends through a hole 172 through the center of the next stationary race 164 and has another cage 173 at its other end. The second cage 173 rides its rollers or balls between the second stationary race 164 and the race of a second spindle 171 similar to the first. The second spindle 171 extends through a hole in the third stationary race 164 and its cage 173 rides its rollers or balls between the third stationary race 164 and a rotatable disc race 174 on a driven shaft 176 which latter is journalled on suitable bearings 177 and holds on its end a suitable device, such as a chuck 178 for holding a drill or the like tool. The usual washer or spring leaf device 179 adjusts the compression of the elements. The stationary races 164 have idler bearings 180 on the sides on which the spindle races 169 are located so as to reduce the friction of the thrust of the spindles thereon. Any number of stages may be employed according to the size and ratio of transmission desired. This illustrative embodiment provides three stages of 1:2 transmission, stepping up the speed of rotation at an over all ratio of 1:8.

We claim:

1. In a transmission of the character described, three substantially parallel disc elements, a plurality of roller members rotatably held in the central disc element so as to be in frictional engagement with the adjacent surfaces of the other two disc elements at the opposite sides of the center disc element, a transmission shaft connected to at least one of said outer disc elements, means to connect the center disc element to another transmission shaft so that the rotary motion caused by the rotation of the roller members is transmitted from one of said transmission shafts to the other transmission shaft of said mechanism, adjustable means to substantially axially press the outer disc elements against said roller members, and antifriction bearing means interposed between said adjustable pressing means and the disc element against which it bears.

2. In a transmission of the character described, a housing, a plurality of transmission units in the housing, each of said transmission units including three disc elements arranged in substantially parallel relation, the center disc element of each unit being formed as a cage for a plurality of roller members in frictional engagement with the outer disc elements at the opposite sides of the center disc element, one of the outer disc elements of each unit at each end of the series of units being held on the housing, means to connect the outer periphery of one of said disc elements of each of said units directly to the outer periphery of one of the disc elements of the next unit of the series of units for rotation of said connected discs together, a transmission shaft connected to one of the disc elements in the first unit of the series, and another transmission shaft connected to one of the disc elements of the last unit of the series in the housing.

3. In a transmission of the character described, a housing, a plurality of transmission units in the housing, each of said transmission units including three disc elements arranged in substantially parallel relation, the center disc element of each unit being formed as a cage for a plurality of roller members in frictional engagement with the outer disc elements at the opposite sides of the center disc element, one of the outer disc elements of each unit at each end of the series of units being held on the housing, means to connect the outer periphery of one of said disc elements of each of said units directly to the outer periphery of one of the disc elements of the next unit of the series of units for rotation of said connected discs together, a transmission shaft connected to one of the disc elements in the first unit of the series, another transmission shaft connected to one of the disc elements of the last unit of the series in the housing, and pressure means between the units to hold the respective disc elements of the units in frictional contact with the respective roller members.

4. In a transmission of the character described, a housing, a plurality of transmission units in the housing, each of said transmission units including three disc elements arranged in substantially parallel relation, the center disc element of each unit being formed as a cage for a plurality of roller members in frictional engagement with the outer disc elements at the opposite sides of the center disc element, one of the outer disc elements of each unit at each end of the series of units being held on the housing, extension means extended from one of the outer disc elements of each unit to the center disc element of the next unit of the series of units for rotation of said connected discs together, a transmission shaft connected to one of the disc elements in the first unit of the series, another transmission shaft connected to one of the disc elements of the last unit of the series in the housing, and adjustable pressure means between the units to hold the respective disc elements of the units in selected frictional contact with the respective roller members.

5. In a transmission of the character described, a housing, a plurality of transmission units in the housing, each of said transmission units including three disc elements arranged in substantially parallel relation, the center disc element of each unit being formed as a cage for a plurality of roller members in frictional engagement with the outer disc elements at the opposite sides of the center disc element, one of the outer disc elements of each unit at each end of the series of units being held on the housing, means to transmit rotation of one of said disc elements of each of said units directly to one of the disc elements of the next unit of the series of units, a transmission shaft connected to one of the disc elements in the first unit of the series, another transmission shaft connected to one of the disc elements of the last unit of the series in the housing, pressure means between the units to hold the respective disc elements of the units in frictional contact with the respective roller members, means to rotatably support said housing with respect to the first transmission shaft, said second transmission shaft being rotatable with the housing.

6. In a transmission of the character described, a housing, a series of transmission units in the housing, each transmission unit including three disc elements arranged in parallel relation, the center disc element of each unit being formed as a cage to hold a substantially circular series of roller members in frictional engagement with the adjacent outer disc elements, one of the disc elements of the unit at one end of the series being connected to a transmission shaft, the cage disc element of each unit being directly connected to one of the outer disc elements of the next following unit, the cage element of the last unit of the series being connected to another transmission shaft, the unconnected disc elements of each unit being held by said housing.

7. In a transmission of the character described, a housing, a plurality of transmission units in the housing, each of said transmission units including three disc elements arranged in substantially parallel relation, the center disc element of each unit being formed as a cage for a plurality of roller members in frictional engagement with the outer disc elements at the opposite sides of the center disc element, one of the outer disc elements of each unit at each end of the series of units being held on the housing, means to transmit rotation of one of said disc elements of each of said units directly to one of the disc elements of the next unit of the series of units, a transmission shaft connected to the center disc of the first unit of said series, another transmission shaft connected to the housing, and means to rotatably support said housing relatively to said first transmission shaft.

8. In a selective transmission, a frame, a plurality of transmission mechanisms in separate housings supported on said frame so that said housings are rotatable independently of each other, transmission units in each of said housings; each transmission unit including three substantially parallel disc elements, held together so that the two outer disc elements bear toward the center disc element, a substantially circular series of roller members held in said center disc element so as to frictionally engage the opposite outer disc elements, one of the outer disc elements being held by the housing; a separate transmission shaft connecting a driven element of each transmission mechanism with a driving element of the next successive transmission mechanism, and shifting means to selectively connect the adjacent transmission mechanisms so that the transmission shafts of said adjacent units are rotated directly at the same speed in one position of the respective shifting mechanisms, and rotation is transmitted to the driven transmission shaft through the rotation of the roller members in another position of said shifting members.

9. In a selective transmission, a frame, a plurality of transmission mechanisms in separate housings supported on said frame so that said housings are rotatable independently of each other, transmission units in each of said housings; each transmission unit including three substantially parallel disc elements held together so that the two outer disc elements bear toward the center disc element, a substantially circular series of roller members held in said center disc element so as to frictionally engage the opposite outer disc elements, one of the outer disc elements being held by the housing; a separate transmission shaft connecting a driven element of each transmission mechanism with a driving element of the next successive transmission mechanism, and shifting means to selectively connect the adjacent transmission mechanisms so that the transmission shafts of said adjacent units are rotated directly at the same speed in one position of the respective shifting mechanisms, and rotation is transmitted to the driven transmission shaft through the rotation of the roller members in another position of said shifting members; in at least one of said transmission mechanisms the driven transmission shaft is rotated by the housing of the transmission mechanism.

10. In a selective transmission, a frame, a plurality of transmission mechanisms in separate housings supported on said frame so that said housings are rotatable independently of each other, transmission units in each of said housings; each transmission unit including three substantially parallel disc elements held together so that the two outer disc elements bear toward the center disc element, a substantially circular series of roller members held in said center disc element so as to frictionally engage the opposite outer disc elements, one of the outer disc elements being held by the housing; a separate transmission shaft connecting a driven element of each transmission mechanism with a driving element of the next successive transmission mechanism, and shifting means to selectively connect the adjacent transmission mechanisms so that the transmission shafts of said adjacent units are rotated directly at the same speed in one position of the respective shifting mechanisms, and rotation is transmitted to the driven transmission shaft through the rotation of the roller members in another position of said shifting members; in at least one of said transmission mechanisms the driven transmission shaft is rotated by the housing of the transmission mechanism; in another of said transmission mechanisms the driving transmission shaft being drivingly connected to the center disc element of a transmission unit, and the driven transmission shaft is connected to an outer disc element of said transmission unit; and in a third of said transmission mechanisms the driving shaft is connected to an outer disc element of one of said transmission units and the driven shaft is connected to the center disc element of another transmission unit of said third transmission mechanism.

11. In a selective transmission, a frame, a plurality of transmission mechanisms in separate housings supported on said frame so that said housings are rotatable independently of each other, transmission units in each of said housings; each transmission unit including three substantially parallel disc elements held together so that the two outer disc elements bear toward the center disc element, a substantially circular series of roller members held in said center disc element so as to frictionally engage the opposite outer disc elements, one of the outer disc elements being held by the housing; a separate transmission shaft connecting a driven element of each transmission mechanism with a driving element of the next successive transmission mechanism, and shifting means to selectively connect the adjacent transmission mechanisms so that the transmission shafts of said adjacent units are rotated directly at the same speed in one position of the respective shifting mechanisms, and rotation is transmitted to the driven transmission shaft through the rotation of the roller members in another position of said shifting members; in at least one of said transmission mechanisms the driven transmission shaft is rotated by the housing of the transmission mechanism; in another of said transmission mechanisms the driving transmission shaft being drivingly connected to the center disc element of a transmission unit, and the driven transmission shaft is connected to an outer disc element of said transmission unit; and in a third of said transmission mechanisms the driving shaft is connected to an outer disc element of one of said transmission units and the driven shaft is connected to the center disc element of another transmission unit of said third transmission mechanism, said shifting mechanism including means between each pair of adjacent transmission mechanisms for connecting the respective housings for direct rotation with the driving shaft in one position of the shifting mechanism, and to hold the housing stationary in the other position of the shifting mechanism, said last means in said first transmission mechanism being so connected that in one position of said shifting mechanism the driving and driven elements in the transmission units in said first transmission mechanism are rotated together with the housing as a unit, and in the other position of said shifting mechanism one of the center disc elements is held relatively stationary so as to permit transmission of rotation through the rotation of the roller members to the housing for driving the driven transmission shaft of said first transmission mechanism.

12. In a transmission of the character described a housing, a shaft rotatably extended into an end of the housing, a disc race rotatable with the shaft in said housing, a second fixed disc race on the end of the housing adjacent said shaft and opposite said first disc race, a cage disc freely rotatable between said disc races, a plurality of rollers held in said cage disc in contact with the disc races, a second shaft rotatably extended through the other end of the housing, and means to couple said cage disc with said second shaft including connecting means extended outside the periphery of said first disc race to said cage disc and rotating with said cage disc.

13. In a transmission of the character described, a housing, a shaft rotatably extended into an end of the housing, a disc race rotatable with the shaft in said housing, a second fixed disc race on the end of the housing adjacent said shaft and opposite said first disc race, a cage disc freely rotatable between said disc races, a plurality of rollers held in said cage disc in contact with the disc races, a second shaft rotatably extended through the other end of the housing, a third disc race on the other end of the housing, a fourth disc race in the housing opposite the third disc race and being rotatable relatively to said second shaft, a second cage disc fixed on said second shaft between said third and fourth disc races, rollers in said second cage disc in contact with said third and fourth disc races, and connecting means extended outside said first disc race to drivingly connect said first cage disc and said fourth disc race.

14. In a transmission of the character described, a housing, a shaft rotatably extended into an end of the housing, a disc race rotatable with the shaft in said housing, a second fixed disc race on the end of the housing adjacent said shaft and opposite said first disc race, a cage disc freely rotatable between said disc races, a plurality of rollers held in said cage disc in contact with the disc races, a second shaft rotatably extended through the other end of the housing, a third disc race on the other end of the housing, a fourth disc race in the housing opposite the third disc race and being rotatable relatively to said second shaft, a second cage disc fixed on said second shaft between said third and fourth disc races, rollers in said second cage disc in contact with said third and fourth disc races, an annular flange extended from said fourth disc race around said first disc race and detachably connected to said first cage disc.

15. In a transmission of the character described, a housing, a shaft rotatably extended into an end of the housing, a disc race rotatable with the shaft in said housing, a second fixed disc race on the end of the housing adjacent said shaft and opposite said first disc race, a cage disc freely rotatable between said disc races, a plurality of rollers held in said cage disc in contact with the disc races, a second shaft rotatably extended through the other end of the housing, a third disc race on the other end of the housing, a fourth disc race in the housing opposite the third disc race and being rotatable relatively to said second shaft, a second cage disc fixed on said second shaft between said third and fourth disc races, rollers in said second cage disc in contact with said third and fourth disc races, connecting means extended outside said first disc race to drivingly connect said first cage disc and said fourth disc race, and pressure means between said first disc and said fourth disc to urge said first and fourth discs away from each other and toward the respective adjacent cage discs.

16. In a transmission of the character described, a housing, a shaft rotatably extended through an end of the housing, a second shaft rotatably extended through the other end of the housing, a pair of opposing disc races at the end of the housing adjacent the first shaft, one of said disc races being secured to the end of the housing and the other disc race being mounted on said first shaft, a cage disc between said disc races, a plurality of rollers carried by said cage disc in engagement with said disc races, a second pair of disc races at the other end of the housing adjacent the second shaft, one of the disc races of said second pair being secured to the adjacent end of the housing, the other disc race of said second pair being held rotatably around the axis of said second shaft, a cage disc on the second shaft extended between the second pair of disc races, a plurality of rollers carried by said second cage disc in engagement with said second pair of disc races; a third pair of disc races positioned in the housing between said first and second pairs of disc races, one disc race of said third pair being held stationary in said housing, the other disc race of said third pair being held rotatably co-axially relatively to said second shaft, means to drivingly connect said last disc race of the third pair and the first cage disc, a third cage disc between the third pair of disc races, a plurality of rollers carried by said third cage disc in engagement with the third pair of disc races, and means to drivingly connect said third cage disc to the rotatable disc race of the second pair of disc races.

17. In a transmission of the character described, a housing, a shaft extended into each end of said housing, three pairs of roller races arranged co-axially in said housing, a cage between each pair of races and a plurality of rollers in each of said cages in contact with the respective opposed races; one race of one of said pairs being secured to an end of said housing and the other race of the same pair being mounted on one of said shafts for rotation therewith; one race of another pair of said races being secured to the other end of the housing and the other race of the second pair being connected to the cage of the third pair of races for rotation; the third pair of races, including one race held on the housing against rotation and another race connected for rotation with the cage between the first pair of races; the cage of the second pair of races being connected to the second shaft for rotation therewith.

18. In a transmission of the character described, a frame, a housing rotatable relatively to said frame, a shaft extended from an end of the housing for rotation with said housing, a second shaft journalled in said frame and extended to the other end of the housing, an extension on said second shaft journalled in said housing for relative rotation; a pair of races at each end of said housing, a cage between each pair of said races, and non-friction rolling elements in each of said cages in contact with the respective opposed pairs of races; one race of each of said pairs being secured to the adjacent end of said housing; the other race of one of said pairs being held relatively stationary on said frame; the other race of the second pair of races being connected to the cage between the first pair of races for simultaneous rotation, the cage between the second pair of races being mounted for rotation relatively to said housing and with the shaft journalled in said frame; said housing being rotatably journalled on said frame.

19. In a transmission of the character described, a frame, a housing rotatable relatively to said frame, a shaft extended from an end of the housing for rotation with said housing, a second shaft journalled in said frame and extended to the other end of the housing, an extension on said second shaft journalled in said housing for relative rotation; a pair of races at each end of said housing, a cage between each pair of said races, and non-friction rolling elements in each of said cages in contact with the respective opposed pairs of races, one race of each of said pairs being secured to the adjacent end of said housing; the other race of one of said pairs being held relatively stationary on said frame; the other race of the second pair of races being connected to the cage between the first pair of races for simultaneous rotation, the cage between the second pair of races being mounted for rotation relatively to said housing and with the shaft journalled in said frame; said housing being rotatably journalled on said frame, and means between the said pairs of races to bear against the second race of the second pair.

20. In a transmission of the character described, a frame, a housing rotatable relatively to said frame, a shaft extended from an end of the housing for rotation with said housing, a second shaft journalled in said frame and extended to the other end of the housing, an extension on said second shaft journalled in said housing for relative rotation; a pair of races at each end of said housing, a cage between each pair of said races, and non-friction rolling elements in each of said cages in contact with the respective opposed pairs of races, one race of each of said pairs being secured to the adjacent end of said housing; the other race of one of said pairs being held relatively stationary on said frame; the other race of the second pair of races being connected to the cage between the first pair of races for simultaneous rotation, the cage between the second pair of races being mounted for rotation relatively to said housing and with the shaft journalled in said frame; said housing being rotatably journalled on said frame, said extension on said shaft being journalled in the farthest end of the housing for relative rotation in said housing.

21. In a transmission of the character described, a frame, a housing rotatably mounted on said frame, two pairs of races arranged co-axially in said housing, one race of each pair being secured to the adjacent end of the housing to rotate therewith; a shaft fixedly extended from one end of said housing; a second shaft in said frame being rotatable relatively to said housing, and an extension shaft from this last shaft being journalled in the other end of said housing; the other race of one of said pairs being secured for rotation with said extension shaft, the other disc of the other pair being connected for rotation to the cage at the farthest end of the housing, the other cage in the other pair being held stationary on said frame.

CARL W. CHERRY.
ALEX S. MULLGARDT.